United States Patent [19]

Usui et al.

[11] Patent Number: 5,172,940
[45] Date of Patent: Dec. 22, 1992

[54] CONNECTOR DEVICE FOR CONNECTING SMALL DIAMETER PIPE

[75] Inventors: Masayoshi Usui, Mumazu; Katsushi Washizu, Sunto, both of Japan

[73] Assignee: Usui Kokusai Sangyo Kaisha, Ltd., Japan

[21] Appl. No.: 439,611

[22] Filed: Nov. 20, 1989

[30] Foreign Application Priority Data

Nov. 21, 1988 [JP] Japan .................. 63-294429

[51] Int. Cl.$^5$ .............................................. F16L 27/00
[52] U.S. Cl. ........................................ 285/31; 285/49;
        285/175; 285/302; 285/319; 285/906; 285/921
[58] Field of Search .................... 285/319, 31, 49, 175,
                                        285/302, 906, 921

[56] References Cited

U.S. PATENT DOCUMENTS

| | | |
|---|---|---|
| 1,299,047 | 4/1919 | Snyder .................... 285/31 |
| 2,420,858 | 5/1947 | Brownell ................ 285/319 |
| 2,892,991 | 6/1959 | Beebee et al. . |
| 3,169,030 | 2/1965 | Lippincott . |
| 3,453,005 | 7/1969 | Foults . |
| 3,565,467 | 2/1971 | Haldopoulos et al. ......... 285/319 X |
| 3,826,523 | 7/1974 | Eschbaugh . |
| 3,885,821 | 5/1975 | Philibert .................. 285/382 X |
| 3,927,451 | 12/1975 | Rogers ..................... 285/31 |
| 3,933,378 | 1/1976 | Sandford et al. . |
| 4,026,581 | 5/1977 | Pasbrig . |
| 4,035,005 | 7/1977 | De Vincent et al. . |
| 4,074,912 | 2/1978 | Van Bilderbeek et al. . |
| 4,275,907 | 6/1981 | Hunt . |
| 4,451,069 | 5/1984 | Melone . |
| 4,632,435 | 12/1986 | Polyak ..................... 285/319 X |
| 4,637,636 | 1/1987 | Guest . |
| 4,637,640 | 1/1987 | Fournier et al. . |
| 4,681,351 | 7/1987 | Bartholomew . |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunningham . |
| 4,793,637 | 12/1988 | Laipply et al. . |

FOREIGN PATENT DOCUMENTS 593413  5/1959  Italy .
855603  12/1960  United Kingdom .

*Primary Examiner*—Dave W. Arola
*Attorney, Agent, or Firm*—Anthony J. Casella; Gerald E. Hespos

[57] ABSTRACT

A connector device for connecting a small diameter pipe is disclosed. The device has a joint body internally formed with a communication bore, first and second pipes intruded into end parts of the joint body, a socket member having elastic pawl walls each impinging on an annular swelling, and sealing members internally provided. The second pipe is movable a given distance in the axial core direction.

21 Claims, 10 Drawing Sheets

CONNECTOR DEVICE FOR CONNECTING SMALL DIAMETER PIPE

BACKGROUND OF THE INVENTION

1. Filed of the Invention

The present invention is directed to a connector device for connecting a resinous tube or a metallic pipe (hereinafter simply referred to as a pipe) having a relatively small diameter of approximately 20 m/m or less, which is arranged as a supply passageway for supplying the air and oil generally to an automobile or a variety of machineries, equipments and so on.

2. Description of the Prior Art

This type of convenitonal connector device for connecting a small diameter pipe is constructed in the following manner. The connector device, as illustrated in FIG. 27, comprises a joint body (21) which may assumes a variety of configurations and is so formed with a screw hole (22) having an enlarged diameter as to communicate with a communication bore formed therein and including a conical seat member (23) at its inner bottom part on one side of the communication bore. An arrangement of a metallic pipe is such that a pipe ($P_{10}$) in an as-intruded state is heat-brazed (W) to a peripheral part of the communication bore (24) at one end, while at the other end a pipe ($P_{20}$) having a flare wall ($P_{20'}$) is intruded into the screw hole (22) by causing the flare wall to impinge on the seat member (23) and then screw-fastened thereto with a nut member (25).

There arise, however, some problems inherent in the above-mentioned prior art. The pipe ($P_{10}$) is connected by heat-brazing (W) at one end of the communication bore (24), while the pipe ($P_{20}$) is connected by screw-fastening in the screw hole (22) by use of the nut member (25) at the other end thereof. This arrangement requires a distance L shown in FIG. 27 as a working space on the occasion of connection to the joint body (21) after arranging the two pipes ($P_{10}$) and ($P_{20}$). As a result, the pipes have to be connected to the joint body by forcibly bending or deforming them, which takes much labor in the connecting operation and presents a probability that the pipe will remain deformed. One of temporary measures is that a hose or the like is attached to one end of the joint body in order to steer clear of such a situation in a production line of automobiles. In a state where the pipe ($P_{10}$) is connected after heat-brazing (W) has been effected at one end, a whole product is forced to undergo anti-corrosive plating, which in turn considerably hinders the workability. Besides, deterioation of mechanical strength takes place in the vicinity of the heat-brazed parts of the pipe ($P_{10}$) due to local overheating in connection with an unaccustomed brazing operation. Other oft-happened problems are that cracks and breakdowns are caused in combination with vibrations when performing the pipe arrangement, and screw-fastening at the other end by use of the nut member (25) adds troublesomeness to the connecting operation. In addition, the pipes are fixedly connected to the joint body (21) by heat-brazing (W) and by screw-fastening, resulting in an additional problem in which some inconvenience or an unusable state is present because of forcible connection.

SUMMARY OF THE INVENTION

It is a primary object of the present invention, which is devised to obviates the foregoing problems inherent in the prior arts, to provide a connector device for connecting a small diameter pipe, by which connection in a narrow place can be attained with facility because a joint body itself is readily movable a predetermined distance in the direction of an axial core, unforcible connection can be effected by adjusting a length of a product in a longitudinal direction when arranging pipes, components are usable in connecting parts including pipes each undergoing process, the workability is remarkably improved by making the plating process unnecessary, and an anxiety for deterioration of mechanical strengths of the pipes in the vicinity of connecting parts is eliminated as well as causing no harassment in the connecting operation.

To accomplish this object, according to one aspect of the invention, there is provided a connector device for connecting a small diameter pipe, comprising: a joint body formed with a communication bore in an interior of an axial core thereof; a first pipe intruded into one end of the joint body; an internally provided sealing member press-fitted to an outer peripheral surface of the first pipe; a socket member having elastic pawl walls each impinging on an annular wall outwardly swollen in the vicinity of a connecting part of the first pipe; a second pipe having an annular collar wall at the connecting end and intruded into the other end of the joint body; and another internally provided sealing member held by caulking inwards the other end thereof, whereby the second pipe is movable a predetermined distance in the direction of an axial core.

According to another aspect of the invention, there is provided a connector device for connecting a small diameter pipe, comprising: a joint body so formed with stepped enlarged diameter chambers in the vicinities of both ends thereof as to communicate with a communication bore formed in an interior of an axial core thereof, the joint body incorporating a bush member engaging with a stepped portion of one enlarged diameter chamber, a sealing member disposed behind the bush member and an annular member or a cylindrical member; and a separate socket member including a plurality of elastic pawl walls shaped integrally therewith and obliquely protruding inwards in an assembling direction in a peripheral part of a through-hole at the center of the axial core, and installed in the other enlarged diameter chamber of the joint body which accommodates a sealing member, characterized in that the elastic pawl wall of the socket member is made to resiliently impinge on an annular wall outwardly swollen in the vicinity of a connecting part of the pipe incorporated into the other enlarged diameter chamber, the sealing member is held by pressing the annular member or cylindrical member while caulking inwards a portion close to the end peripheral part of one enlarged diameter chamber, and in the interior of one enlarged diameter chamber the pipe is movable a predetermined distance in the axial core direction.

In the connector device for connection in accordance with the present invention, the joint body is movable a given distance in the axial core direction without varying relative positions of two pipes arranged, and one pipe is connected by insertion thereof at a simple touch. With this arrangement, the connection of the pipes to the joint body can highly be facilitated, thereby eliminating the troublesomeness in terms of operation. The components are usable at the connecting parts including the pipes which have previously been plated. After the connection has been effected, the plating process becomes unnecessary, resulting in a remarkable improvement of the workability. Besides, it is possible to eradicate an anxiety for deterioration of mechanical strengths of the pipes in close proximity to the connecting parts and expedite the connection in a narrow place. In addition, unforcible connection can be attained by adjusting a length of the product in a longitudinal direction when arranging the pipes.

BRIEF DESCRIPTION OF THE DRAWINGS

Other objects and advantages of the invention will become apparent during the following discussion taken in conjunction with the accompanying drawings, in which.

DETAILED DESCRIPTION OF PREFERRED EMBODIMENTS

Figure 1:
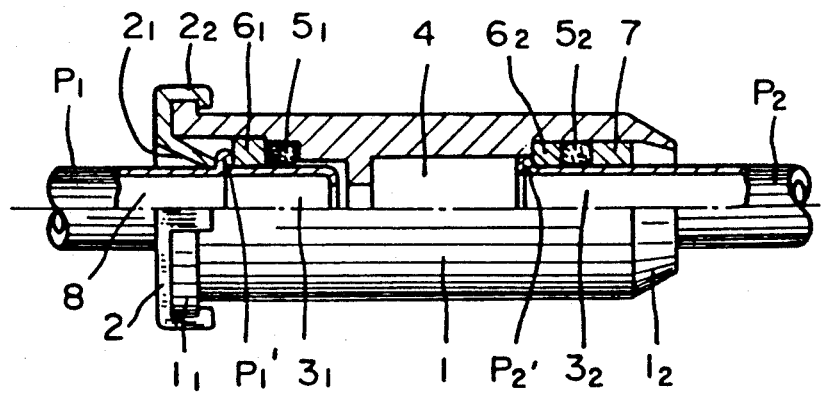
FIG. 1 is a partially cut-away sectional view illustrating a connector device for connecting a small diameter pipe when actually connecting the pipe in one embodiment of the present invention.
Figure 2:
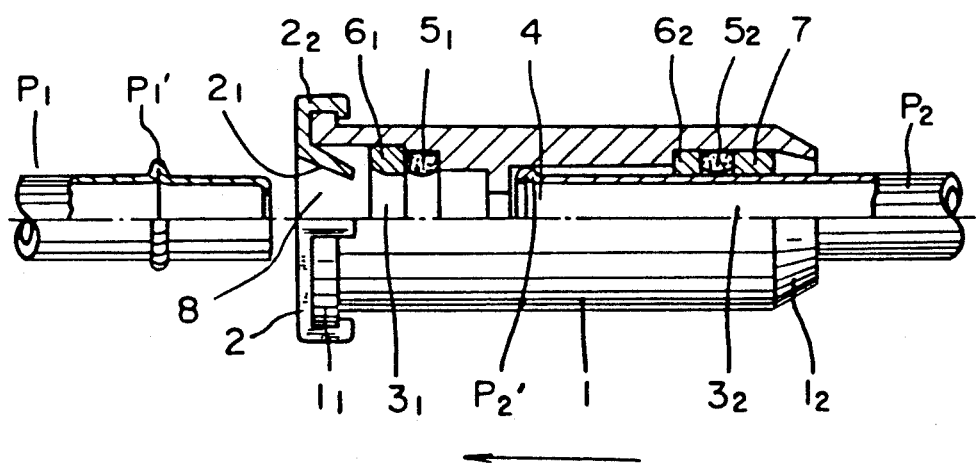
FIG. 2 is a view depicting a state before connecting the pipe to an enlarged diameter chamber at one end.

Referring to FIGS. 1 through 24, a joint body generally designated at (1) formed, in its interior of an axial core, with a communication bore (4) including peripheral wall in the vicinity of both ends which serve as stepped enlarged diameter chambers ($3_1$ and $3_2$) each communicating therewith. Indicated at ($1_1$) is a collar wall protruding outwards from a peripheral edge at one end of the enlarged diameter chamber ($3_1$). The enlarged diameter chamber ($3_1$) accommodates a sealing member ($5_1$) formed of an elastic material such as rubber and engaging with a stepped portion thereof and a bush member ($6_1$) disposed behind the sealing member. The enlarged diameter chamber ($3_2$) formed at the other end accommodates a bush member ($6_2$) engaging with a stepped portion thereof, a like sealing member ($5_2$) disposed in rear of the bush member and an annular member (7), positioned in rear of the sealing member, for retaining the sealing member.

Denoted at (2) is a separate socket member formed of a metallic spring material or a resinous material, the socket member (2) including a plurality of elastic pawl walls ($2_1$) shaped integrally therewith and obliquely protruding inwards in an assembling direction in a peripheral part of a through-hole (8) at the center of the axial core. The socket member (2) also has crooked walls ($2_2$) shaped at an outer peripheral end and supportingly fitted to the collar walls ($1_1$) of the joint body (1). Based on this construction, a tip of the elastic pawl wall ($2_1$) of the socket member (2) elastically impinges on an annular wall ($P_1'$) swollen outwardly in close proximity to a connecting end part of a pipe ($P_1$) incorporated into the enlarged diameter chamber ($3_1$), and at the same moment the sealing member ($5_1$) is press-fitted to an outer peripheral surface of the pipe ($P_1$). The joint body (1) is moved in a direction indicated by an arrow of FIG. 2 to an outwardly swollen annular collar wall ($P_2'$) shaped at a connecting end of the pipe ($P_2$) incorporated beforehand into the enlarged diameter chamber ($3_2$) at the other end of the joint body, thus obtaining engagement with the bush member ($6_2$). The sealing member ($5_2$) is held by pressing the annular member (7) while caulking inwards a portion close to an end peripheral part ($1_2$) of the enlarged diameter chamber ($3_2$), with the result that the sealing member ($5_2$) is press-fitted to the outer peripheral surface of the pipe ($P_2$). The joint body (1) is thus movable a predetermined distnace in an axial core direction within the enlarged diameter chamber ($3_2$).

Note that a reinforcing member composed of a cylindrical metal piece formed beforehand at its top with a collar may be fitted to the inside of the connecting end when the pipe ($P_2$) is constructed by a resinous tube, and the annular collar wall ($P_2'$) of the pipe ($P_2$) may take a double wall structure.

Figure 3:
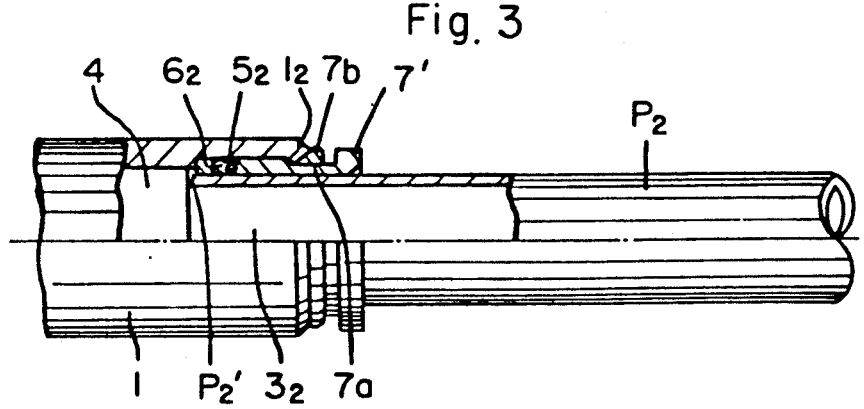
FIGS. 3 to 24 are partially cut-away sectional views of the principal portion of the invention, showing other embodiments relative to a connecting part at which the pipe is incorporated into the enlarged diameter chamber at the other end.
Figure 4:
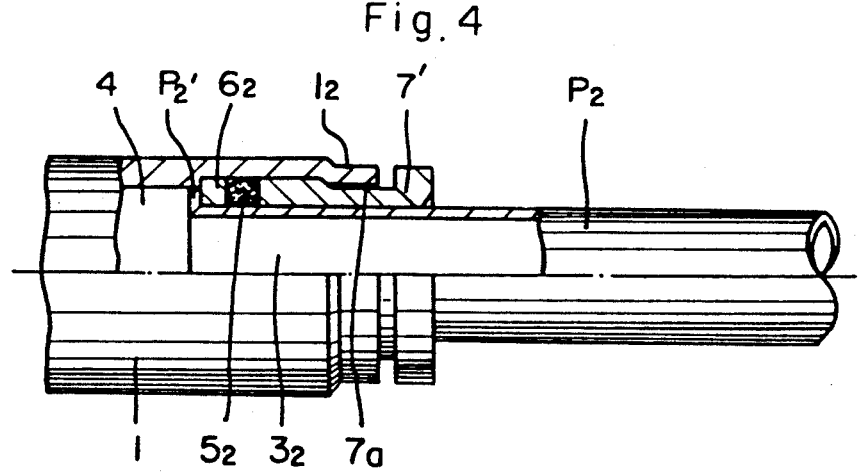
Figure 5:
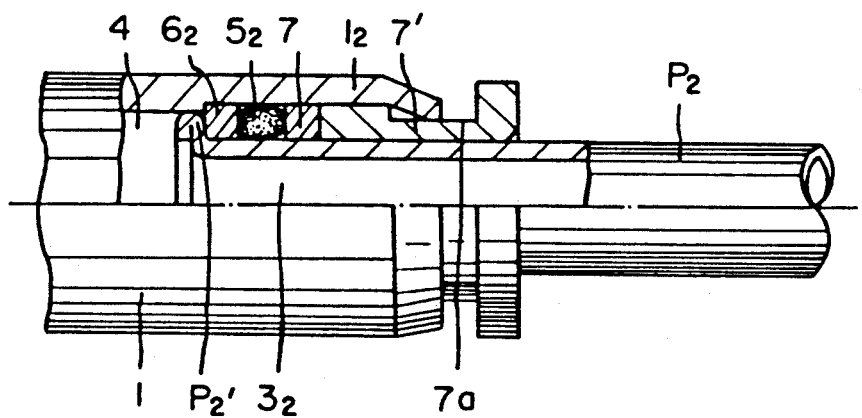

According to the present invention, instead of the annular member (7) there may be provided an annular member (7') having its outer periphery chased, as illustrated in FIGS. 3 and 4, with an annular recessed groove (7a). The annular recessed groove (7a) may be pressed by caulking inwards the end peripheral part ($1_2$) of the enlarged diameter chamber ($3_2$). Besides, as depicted in FIG. 5, the annular member (7') assuming the same configuration may also be disposed behind the annular member (7). It is to be noted that the symbol (7b) in FIG. 3 represents an annular elastic member provided for preventing interference of the end peripheral part ($1_2$) with the recessed groove (7a).

Figure 6:
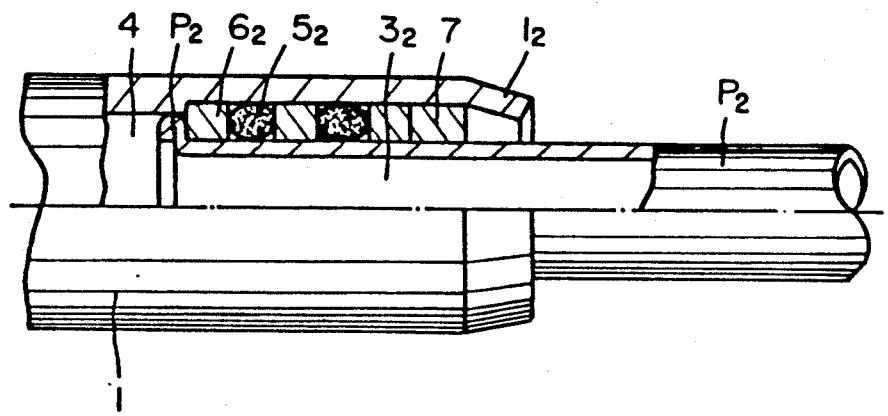
Figure 7:
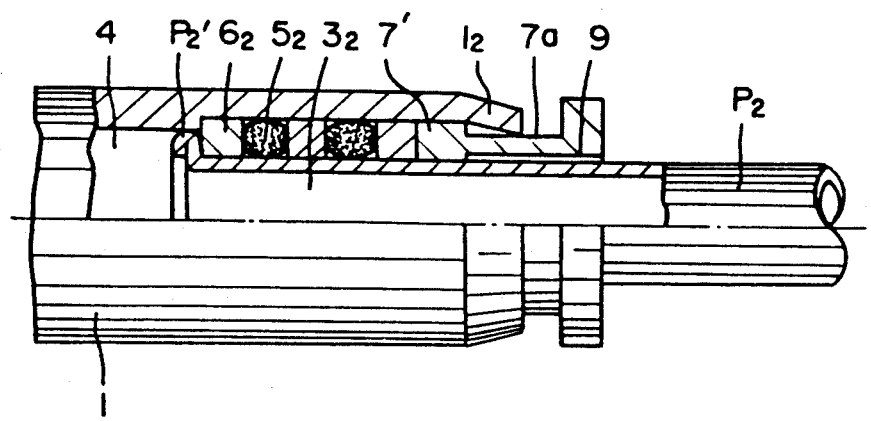

A plurality of sealing members ($5_2$) and a plurality of vibration absorbing ring members are, as illustrated in FIGS. 6 and 7, alternately disposed between the annular member (7) and the bush member ($6_2$). This arrangement further improves a sealing property and a vibration resistant property as well. FIG. 7 shows an arrangement in which the annular member (7') is made of a flexible material, and a gap (9) is formed between inner and outer peripheral surfaces thereof with the intention of preventing these peripheral surfaces from being frictionally defaced due to concentration of stress or interference with each other. If some flexibility is given to the cylindrical metal member, an effect in keeping air-tightness is further ameliorated.

Figure 8:
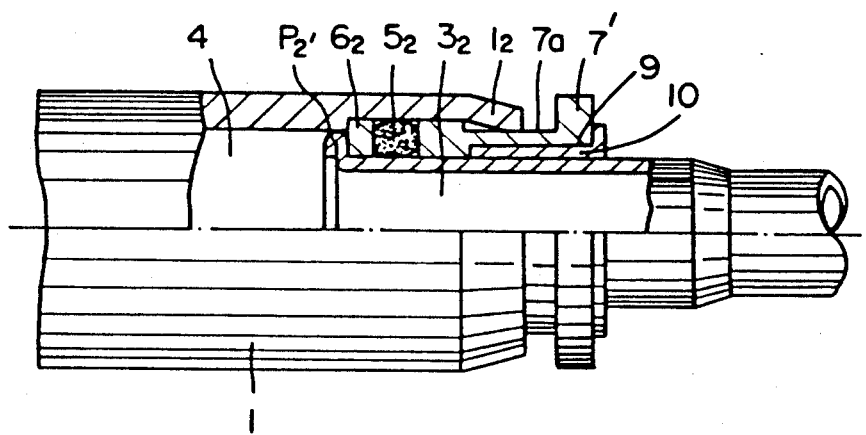
Figure 9:
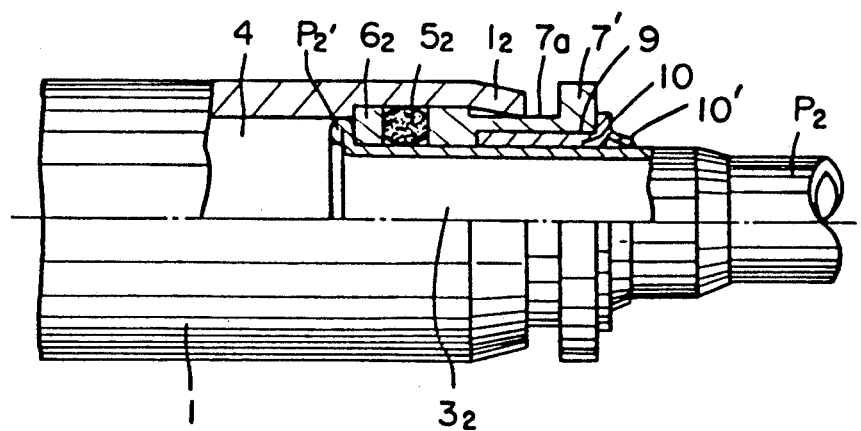
Figure 10:
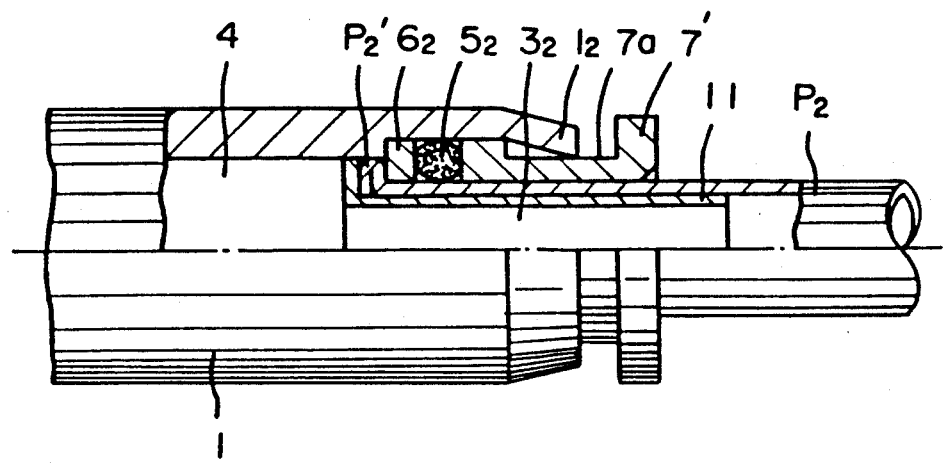

The same effects as those described above can be obtained by fitting, as illustrated in FIGS. 8 and 9, a ring-like flexible member (10) into the gap (9). In this case, if a part of the flexible member (10) is stretched in the axial direction to shape an annular lip (10') (FIG. 9), a dust sealing effect can be exhibited.

Turning to FIGS. 10 to 17, there are depicted arrangements in which to reduce fatigue stress due to vibrations by increasing rigidity while press-fitting a sleeve (11) to the inner peripheral part of the pipe ($P_2$).

Figure 11:
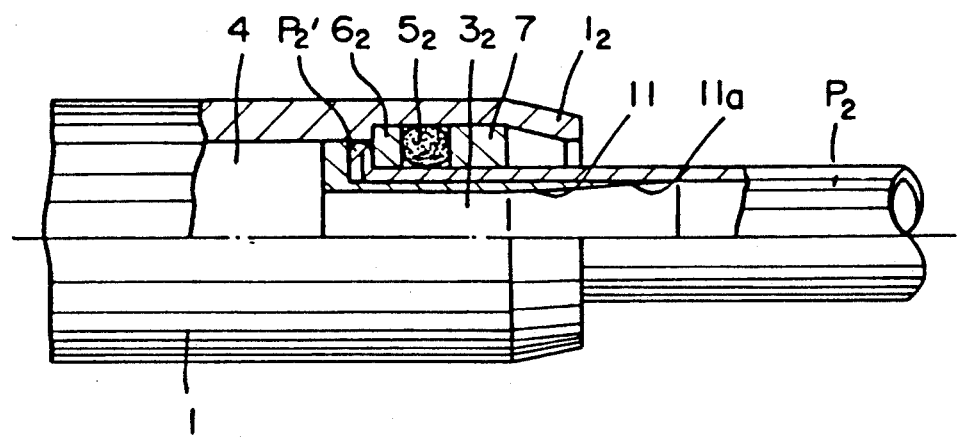
Figure 12:
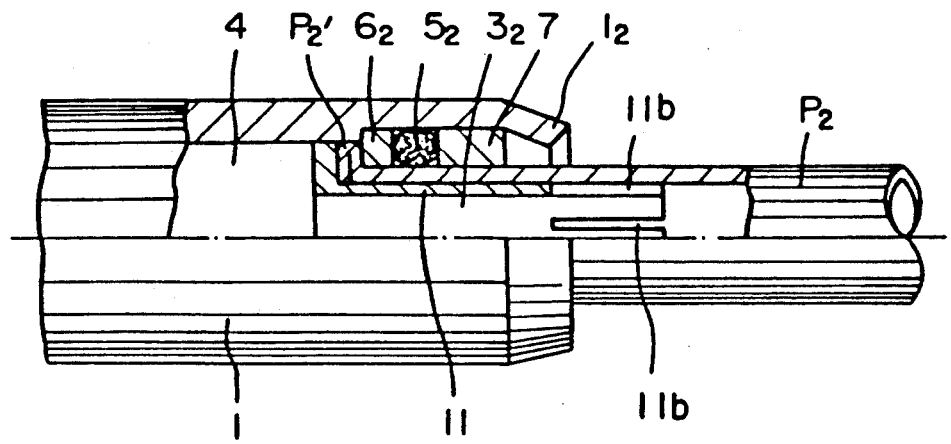
Figure 13:
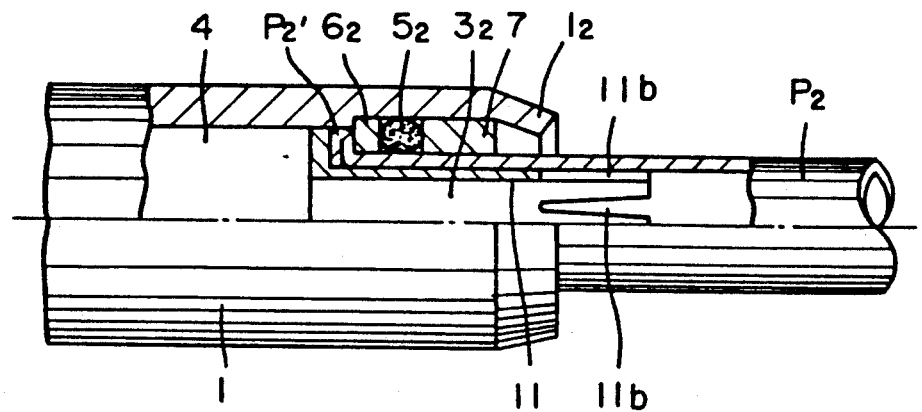
Figure 14:
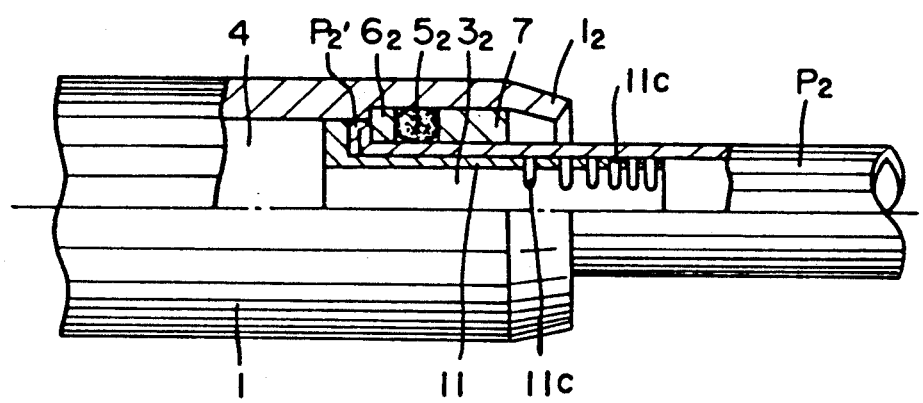
Figure 15:
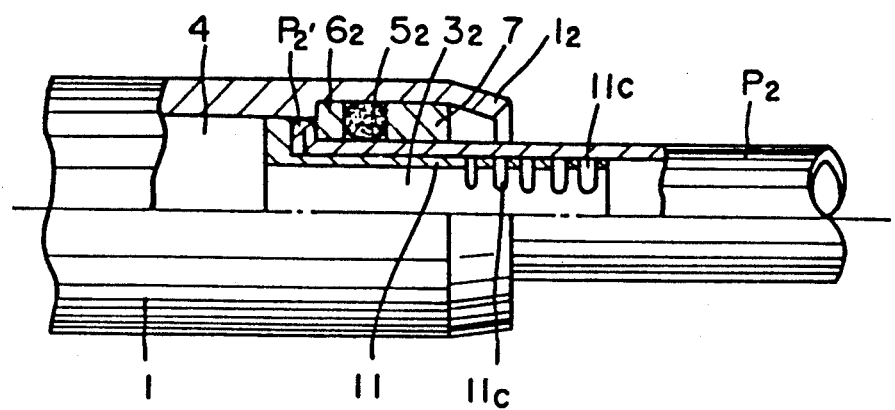
Figure 16:
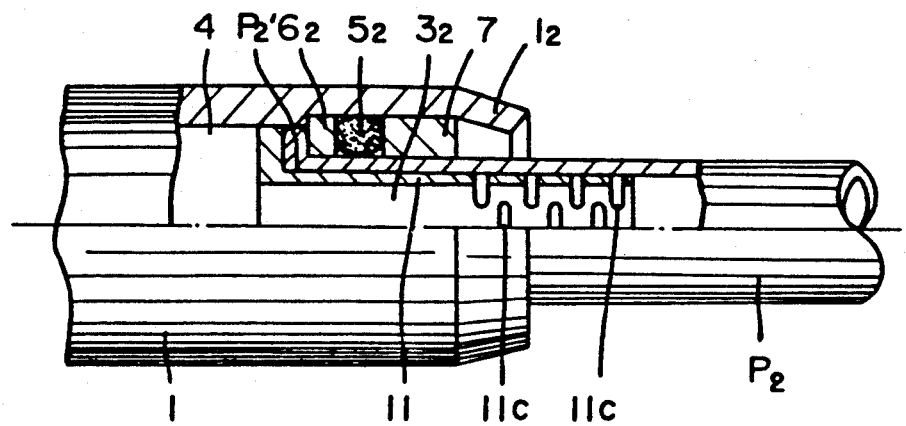
Figure 17:
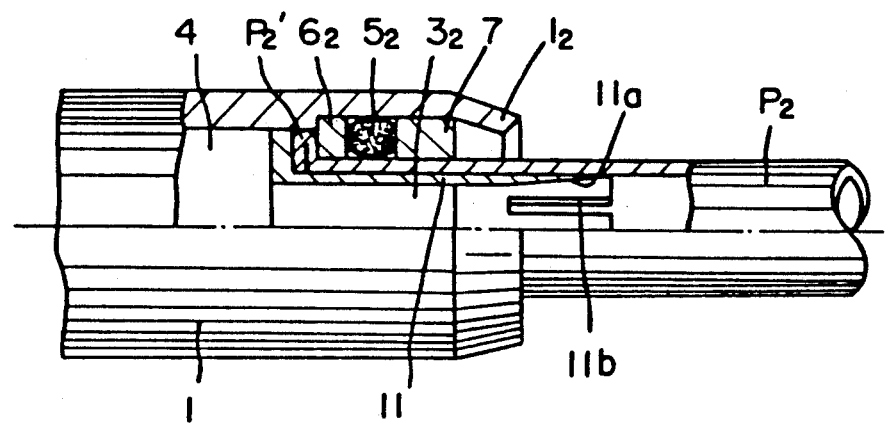

In order to relieve the concentration of stress, a rear part of the sleeve (11) is preferably formed with a tapered wall (11a) (FIG. 11). To exemplify other means, as illustrated in FIGS. 12 and 13, a slit (11b) may be formed in the axial direction; or alternatively, slits (11c) may, as depicted in FIGS. 14 to 16, also be provided in the radial direction. The axially extended slit (11b) is expanded in a fan-shape towards the rear end thereof, whereas the radially extended slits (11c) are narrowed in spacing therebetween towards the rear ends thereof; or slit widths are sequentially enlarged, whereby the concentration of stress is further relieved. The tapered wall (11a) may, as shown in FIG. 17, be combined with the slit (11b).

Figure 18:
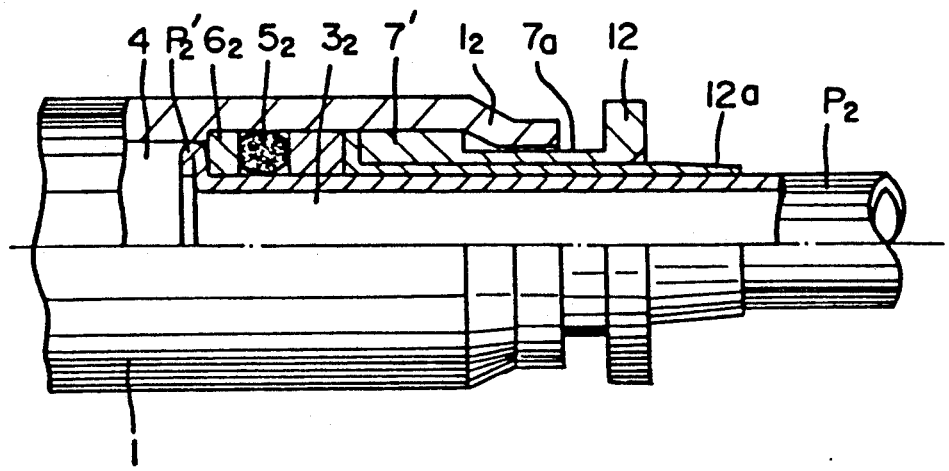
Figure 19:
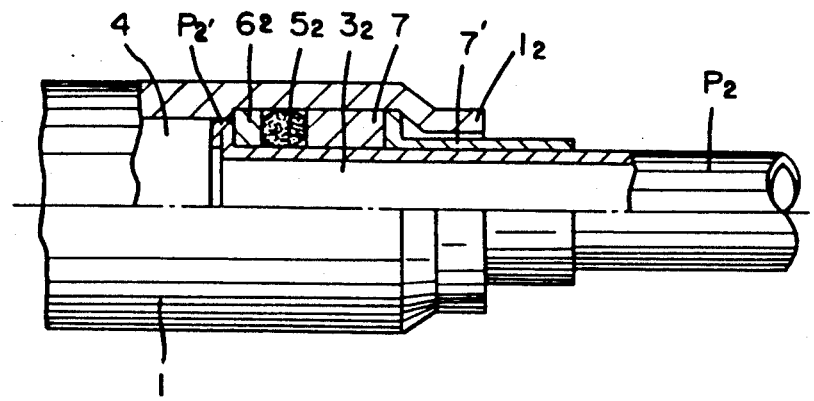
Figure 20:
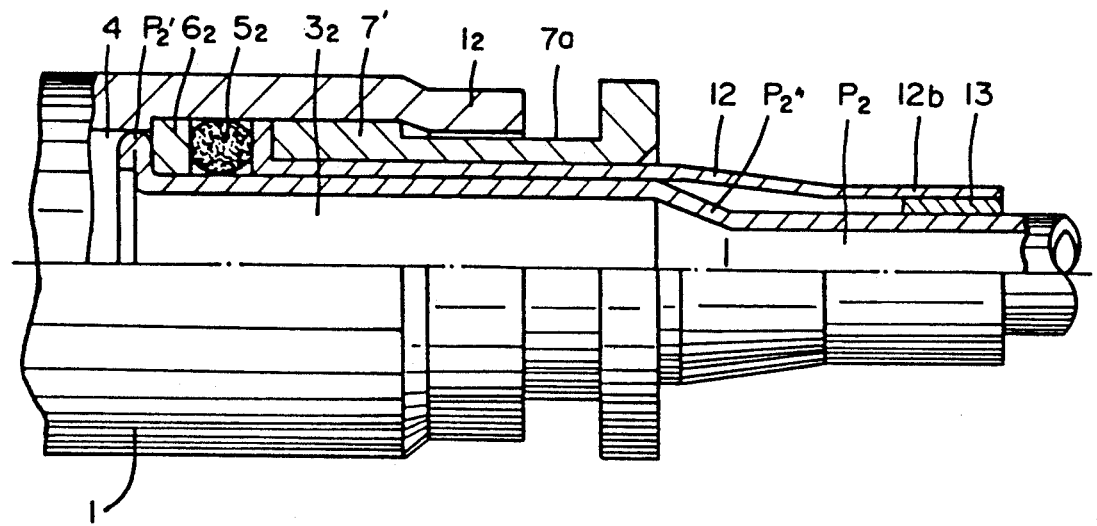
Figure 21:
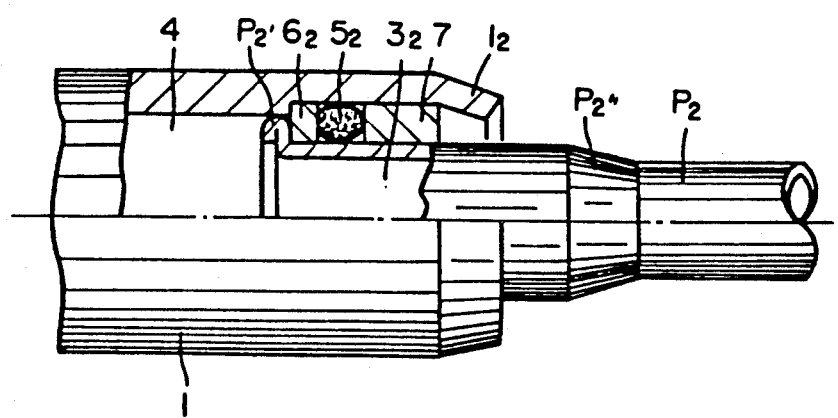
Figure 22:
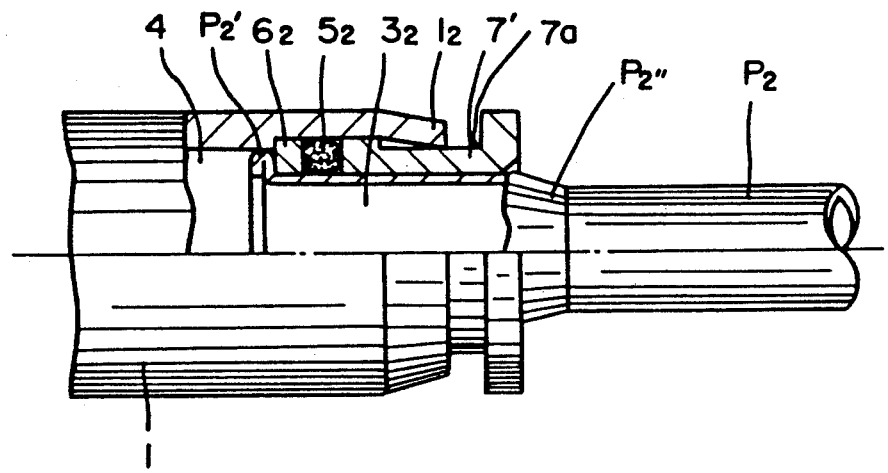
Figure 23:
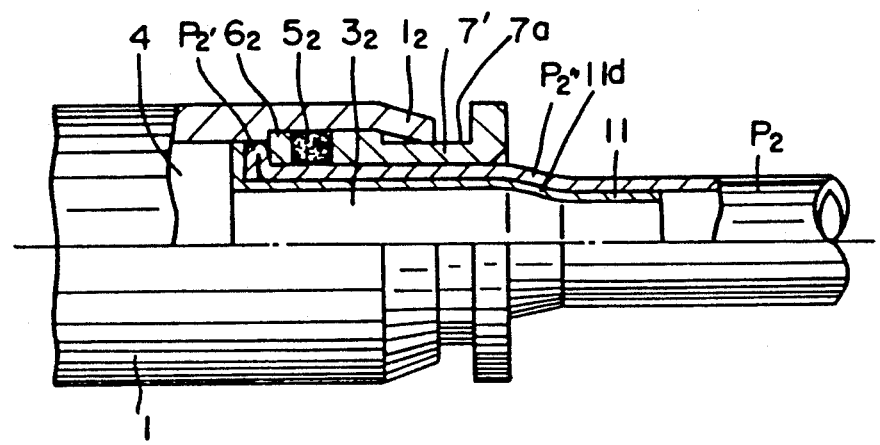
Figure 24:
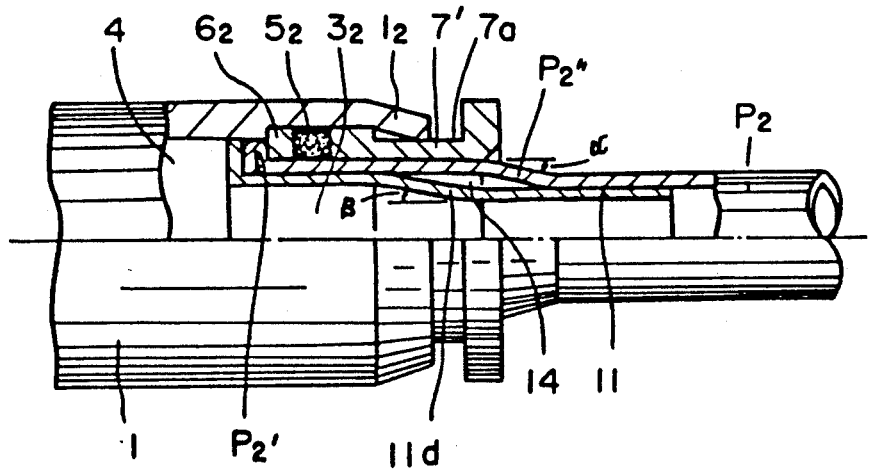
Figure 25A:
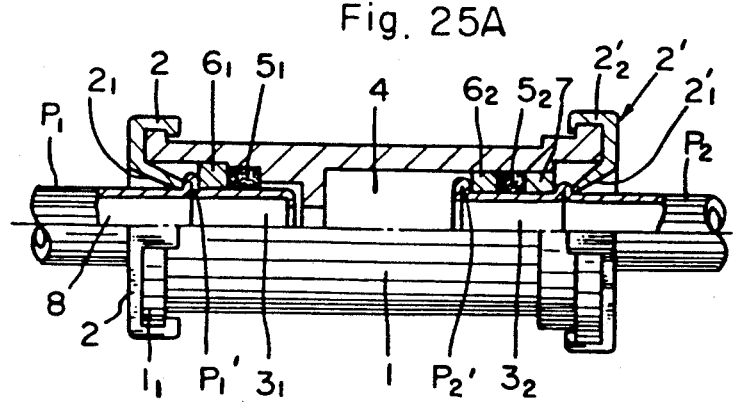
FIGS. 25A–C and 26 are partially cut-away sectional views showing respectively an another embodiment and a still another embodiment of the present invention.

The same effects as those in FIGS. 11 through 17 can be acquired even by fitting, as depicted in FIGS. 18 and 20, the sleeve (12) to the outer periphery of the pipe ($P_2$), and preferably the rear end of the sleeve (12) is formed with a tapered wall (12a). Turning to FIG. 19, there is illustrated a cylindrical member (7') formed thin to exhibit the same effect as that of the externally fitted sleeve. FIG. 20 shows an arrangement wherein in the case of providing, as will be mentioned later, the pipe ($P_2$) with a stepped enlarged diameter part ($P_2''$), an axially rear end of the sleeve (12) is reduced in diameter, and the thus diameter-reduced part is made to impinge on the outer peripheral surface of the pipe ($P_2$). In this case, preferably a wobble member (13) is interposed between an inner peripheral surface of the narrowed diameter part (12b) and an outer peripheral surface of the pipe ($P_2$). As depicted in FIGS. 21 to 24 in regards to the arrangement shown in FIG. 20, a stepped enlarged diameter chamber ($P_2''$) may be formed in the vicinity of an end of the pipe ($P_2$) inserted into the enlarged diameter chamber ($3_2$). With this configuration, the strength against fatigues can be increased owing to the enlarged diameter chamber of the pipe ($P_2$). In this case, the sleeve (11) press-fitted to the inner peripheral surface of the pipe ($P_2$) is provided with a stepped enlarged diameter part (11b), and the outer peripheral surface of the sleeve (11) is closely fitted to the inner peripheral surface of the pipe ($P_2$) (FIG. 23); or alternatively, an angle ($\alpha$) of the stepped enlarged part ($P_2''$) of the pipe ($P_2$) is set larger than an angle ($\beta$) of the stepped enlarged diameter part (11d) of the internally fitted sleeve (11), and further there is formed a gap (14) between the inner peripheral surface of the pipe ($P_2$) (FIG. 24). The vibration resistant property of the pipe ($P_2$) can thus be improved.

The foregoing descriptions are the embodiments shown in FIGS. 1 to 24, wherein the pipe ($P_2$) is connected by caulking inwards a portion close to the end peripheral part ($1_2$) of the enlarged diameter chamber ($3_2$).

Figure 25:
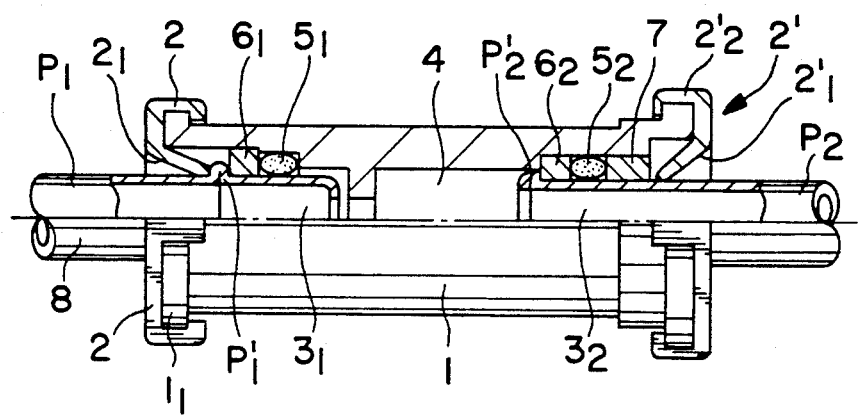
Figure 25:
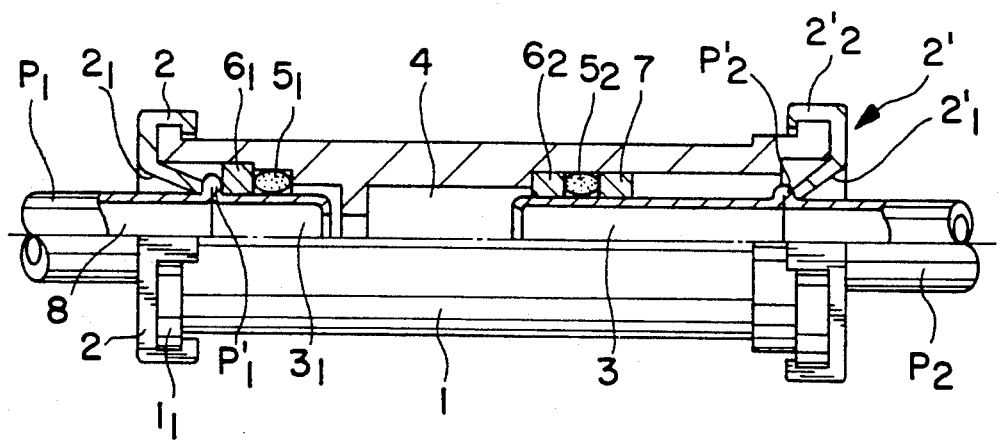

The present invention is not limited to the abovementioned embodiments and can include a further embodiment as shown in FIG. 25 wherein a socket member (2') having the structure similar to that of the socket member (2) shown in FIG. 1 is fixed to a collar wall on the side of the pipe ($P_2$) by a crooked wall ($2'_2$), the socket member (2') of which including a plurality of elastic pawl walls ($2'_1$) shaped integrally therewith and obliquely protruding inwards in an assembling direction, and an annular recess is formed at an end of the enlarged diameter chamber ($3_2$) of the joint body (1) so that the elastic pawl wall ($2'_1$) may be flexibly bent inwardly when inserting the pipe ($P_2$) mounted thereon the sealing member ($5_2$), bush member ($6_2$) and annular member (7) into the joint body (1) and when the insertion of the pipe ($P_2$) is completed, a tip of the lastic pawl wall ($2'_1$) may be engaged with an annular bulged portion of the pipe ($P_2$).

Figure 26:
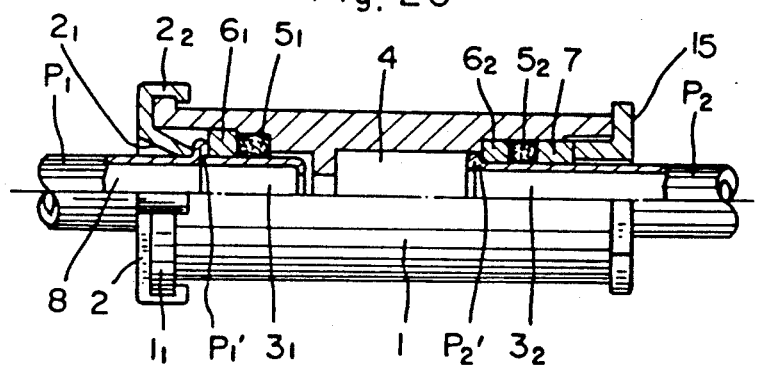
Figure 27:
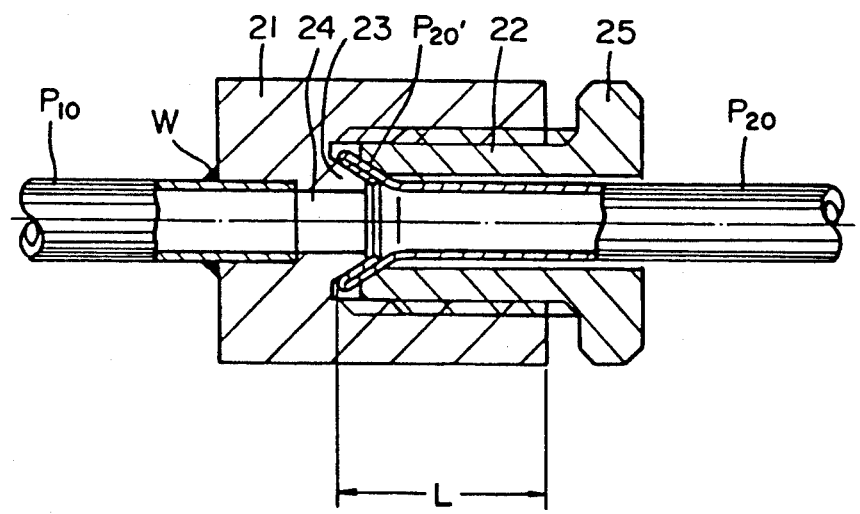
FIG. 27 is a partially cut-away sectional view depicting a conventional connector device for connection when connecting pipes.

Alternatively, as shown in FIG. 26, after the insertion of the pipe ($P_2$) a nut (15) may be threaded into the annular recess so as to press an end of the annular member (7).

As discussed above, the connector device for connecting the small diameter pipe in accordance with the present invention exhibits the following effects. The pipe ($P_2$) is previously incorporated into the enlarged diameter chamber ($3_2$) disposed at the other end thereof without varying relative positions of the arranged pipes ($P_1$) and ($P_2$). In an as-incorporated state, the joint body (1) is movable a given distance in the axial core direction. The pipe ($P_1$) is inserted at a simple touch into enlarged diameter chamber ($3_1$) at one end which communicates with the communication bore (4) formed in the interior of the axial core of the joint body (1). This arrangement makes the connection extremely easy simply by inserting the pipe ($P_1$) into one enlarged diameter chamber while moving the joint body (1) even in a narrow place on the occasion of the connecting operation, thereby eliminating the harassment. Moreover, dimensional errors in the longitudinal direction when arranging the pipes can be absorbed, and unforcible connection can also be provided. The components are usable in the connecting parts including the pipes ($P_1$ and $P_2$) which have undergone the plating process beforehand. After effecting the connection, the plating process becomes non-essential, as result of which the workability is outstandingly improved. There disappears a worry about the deterioration of the mechanical strengths of the pipes ($P_1$ and $P_2$) in close proximity to the connecting parts. Thus, the highly useful connector device for connecting the small diameter pipe can be obtained.

Although the illustrative embodiments of the present invention have been described in detail with reference to the accompanying drawings, it is to be understood that the present invention is not limited those precise embodiments. Various changes or modifications may be effected therein by skilled in the art without departing from the scope or spirit of the invention.

What is claimed is:

1. A connector device for connecting first and second small diameter pipes, each said pipe having an end portion, said end portions being spaced apart and disposed in generally aligned relationship, said connector device comprising:

a joint body having opposed first and second axial ends and a bore formed coaxially through the inside of said joint body, said bore defining first and second chambers adjacent the respective first and second ends of the joint body, the first and second chambers defining cross sections for receiving the end portions of the respective first and second pipes therein, the first end of the joint body including first sealing means and fixing means for sealingly connecting the first pipe to said joint body simultaneously upon engagement of said first end of said joint body over the end portion of said first pipe; second sealing means in the second end of the joint body for sealing the second pipe in the second chamber; and a holding means formed at the second end of said joint body for holding sealingly but movably the end portion of the second pipe in the second chamber after engagement of said second end of said joint body over the end portion of the second pipe, the second chamber defining an axial length to enable sufficient axial movement of the joint body relative to the second pipe to enable the first chamber to be moved toward and sealingly connect with the end portion of the first pipe, whereby the connector device enables connection of the first and second pipes without moving either of said pipes.

2. The connector device as set forth in claim 1, wherein said holding means is formed by caulking inwardly said second end of said joint body.

3. The connector device as set forth in claim 1, wherein said holding means comprises a socket member formed at said second end of said joint body and having a plurality of elastic pawl walls protruding obliquely and inwardly of said joint body.

4. The connector device as set forth in claim 1, wherein said holding means comprises a nut to be threaded in the inside of said second end of said joint body.

5. A connector device for connecting small diameter pipes, comprising:
a joint body having opposed first and second ends and formed with a communication bore in an interior of an axial core thereof, said communication bore defining first and second pipe-receiving chambers adjacent the respective first and second ends of the joint body;
a first pipe having a connecting part adjacent one end, said connecting part including an outwardly swollen wall, the connecting part of said first pipe being dimensioned for engagement in the first pipe-receiving chamber of said joint body;
a first sealing member sealing engaged in a portion of the joint body defining the first chamber and press-fitted to an outer peripheral surface of the connecting part of said first pipe upon movement of the first end of the joint body over the connecting part of the first pipe to seal the first pipe to the joint body;
a socket member on the first end of the joint body having elastic pawl walls each impinging on the annular wall outwardly swollen on the connecting part of said first pipe upon movement of the first end of the joint body over the connecting part of the first pipe and said elastic pawl walls over said outwardly swollen wall;
a second pipe having a connecting end, an annular collar wall at the connecting end being disposed in the second pipe receiving chamber of said joint body, the second pipe receiving chamber extending inwardly and toward the first end of the joint body from the connecting end of the second pipe; and
a second internally provided sealing member disposed around the second pipe and held by caulking inwards of the second end of the joint body for sealing the second pipe with the joint body and for preventing separation of the joint body from the second pipe, whereby said joint body is movable a predetermined distance in the direction of the axial core and along the second pipe for urging the first end of the joint body and the socket over the connecting part of the first pipe for connecting the first and second pipes.

6. The connector devcie as set forth in claim 5, wherein the second pipe receiving chamber defines a stepped enlarged diameter chamber which is formed with a stepped portion, a bush member disposed in the stepped portion of the stepped enlarged diameter chamber, the second sealing member disposed between said bush member and the second end of the joint body, and an annular member disposed between the second sealing member and the second end of the joint body.

7. The connector device as set forth in claim 6, wherein a plurality of said sealing members and a plurality of vibration absorbing ring members are alternately interposed between said bush member and said annular member.

8. The connector device as set forth in claim 6, wherein said annular member is formed of a flexible material.

9. The connector device as set forth in claim 6, wherein a gap is formed between an inner peripheral surface of said annular member and an outer peripheral surface of said second pipe.

10. The connector device as set forth in claim 9, wherein a ring-like flexible member is fitted into said gap.

11. The connector device as set forth in claim 10, wherein a part of said flexible member facing axially outwardly from the joint body is stretched in the axially direction away from the joint body to shape an annular lip for exhibiting a dust sealing effect.

12. The connector device as set forth in claim 5, further comprising a sleeve having a rear end press-fitted into an interior of said second pipe.

13. The connector device as set forth in claim 12, wherein the rear end of said sleeve is formed with a tapered wall.

14. The connector device as set forth in claim 12, wherein at least one slit is formed at the rear end of said sleeve.

15. The connector device as set forth in claim 5, further comprising a sleeve having a rear end fitted to an outer peripheral surface of said second pipe.

16. The connector device as set forth in claim 15, wherein the rear end of said sleeve is formed with a tapered wall.

17. The connector device as set forth in claim 15, wherein a gap is formed between the inner peripheral surface of said sleeve and the outer peripheral surface of said second pipe.

18. The connector device as set forth in claim 5, wherein the second pipe comprises a stepped enlarged diameter part in the vicinity of the connecting end.

19. The connector device as set forth in claim 18, wherein a sleeve closely attached to the inner peripheral surface of said second pipe is press-fitted into the interior of said second pipe.

20. The connector device as set forth in claim 18, wherein the stepped enlarged diameter part of the second pipe includes a conical portion defining a transition between the stepped enlarged diameter part and portions of the second pipe adjacent to the stepped enlarged diameter part, the conical portion defining a selected angle relative to the axial direction of the second pipe, a sleeve disposed over the stepped enlarged diameter part of the second pipe and over portions of the second pipe adjacent to the stepped enlarged diameter part thereof, said sleeve including a stepped enlarged diameter part including a conical portion defining an angle which is smaller then the angle of the conical portion of said enlarged diameter part of said second pipe, such that a gap is formed between an inner peripheral surface of said sleeve and an outer peripheral surface of said second pipe.

21. A connector device for connecting first and second small diameter pipes, said first pipe having a connecting part adjacent an end thereof with an annular wall being outwardly swollen on said connecting part, said pipes being in axially aligned spaced apart relationship, said connector device comprising:

a joint body with opposed first and second ends a first chamber formed in the first end of the joint body and a second chamber formed in the second end of the joint body, the second chamber including a stepped portion facing the second end of the joint body, a communication bore formed in an interior of an axial core of said joint body and connecting the first and second chambers, said joint body incorporating a first sealing member in said first chamber and a bush member engaging with the stepped portion of said second chamber, a second sealing member disposed between said bush member and the second end of the joint body, and an annular member engaged between the sealing member and the second end of the joint body, an end portion of said second pipe being in the second chamber and being prevented from separation from the joint body by the bush member, the second sealing member and the annular member; and a socket member mounted on the first end of the joint body and including a plurality of elastic pawl walls shaped integrally therewith and obliquely protruding inwards in said first chamber of said joint body, said elastic pawl walls of said socket member being made to resiliently impinge on the annular wall outwardly swollen on the connecting part of said first pipe upon movement of the first end of the joint body over said connecting part of said first pipe, said sealing member of said second chamber being held by pressing said annular member while caulking inwards a portion close to the second end of said joint body, and the interior of said second enlarged diameter chamber being dimensioned such that the joint body is movable a predetermined distance in said axial core direction relative to the second pipe for moving the pawl walls and the first chamber over the connecting part of the first pipe for connecting the first and second pipes.

* * * * *